Patented May 9, 1933

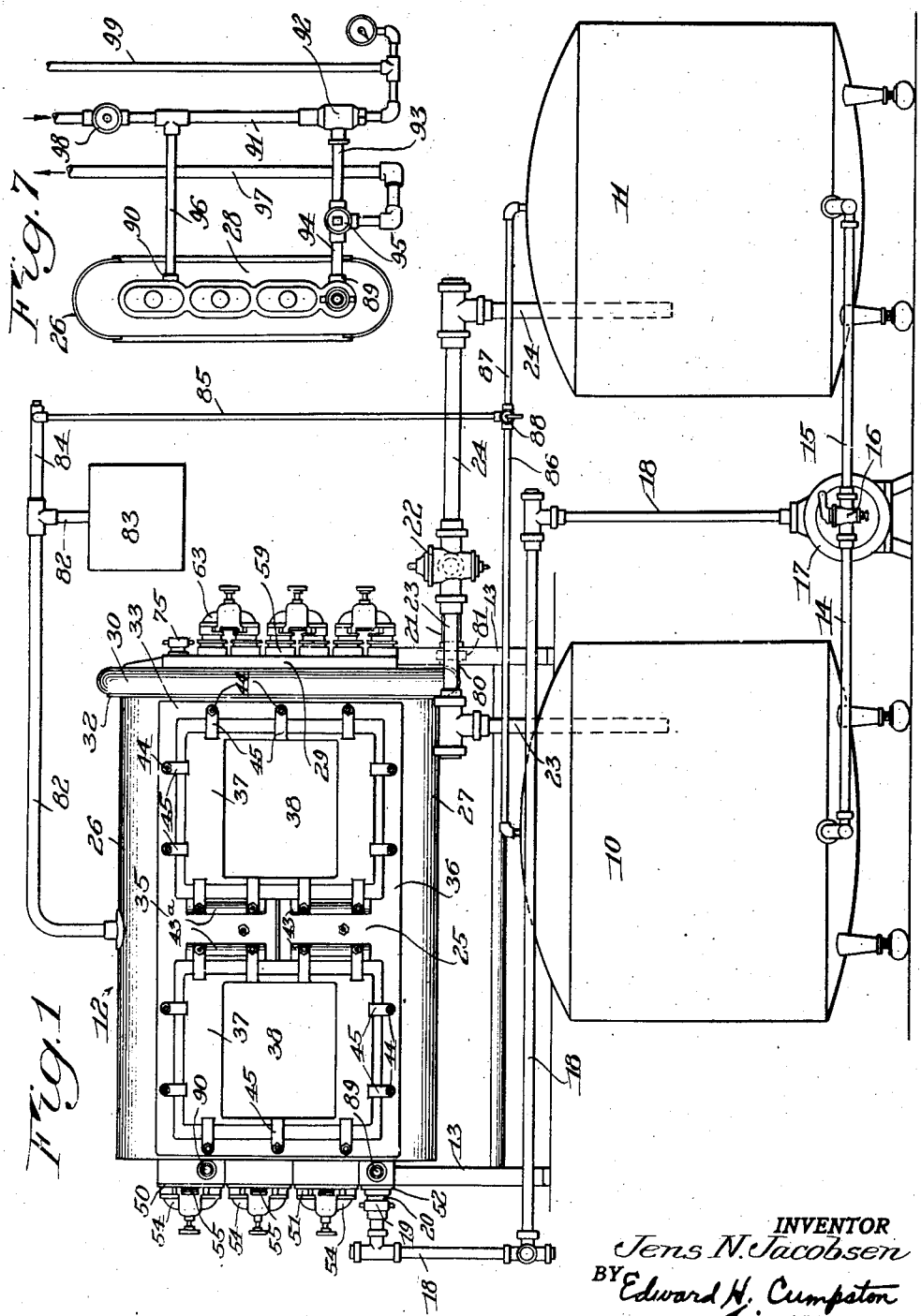

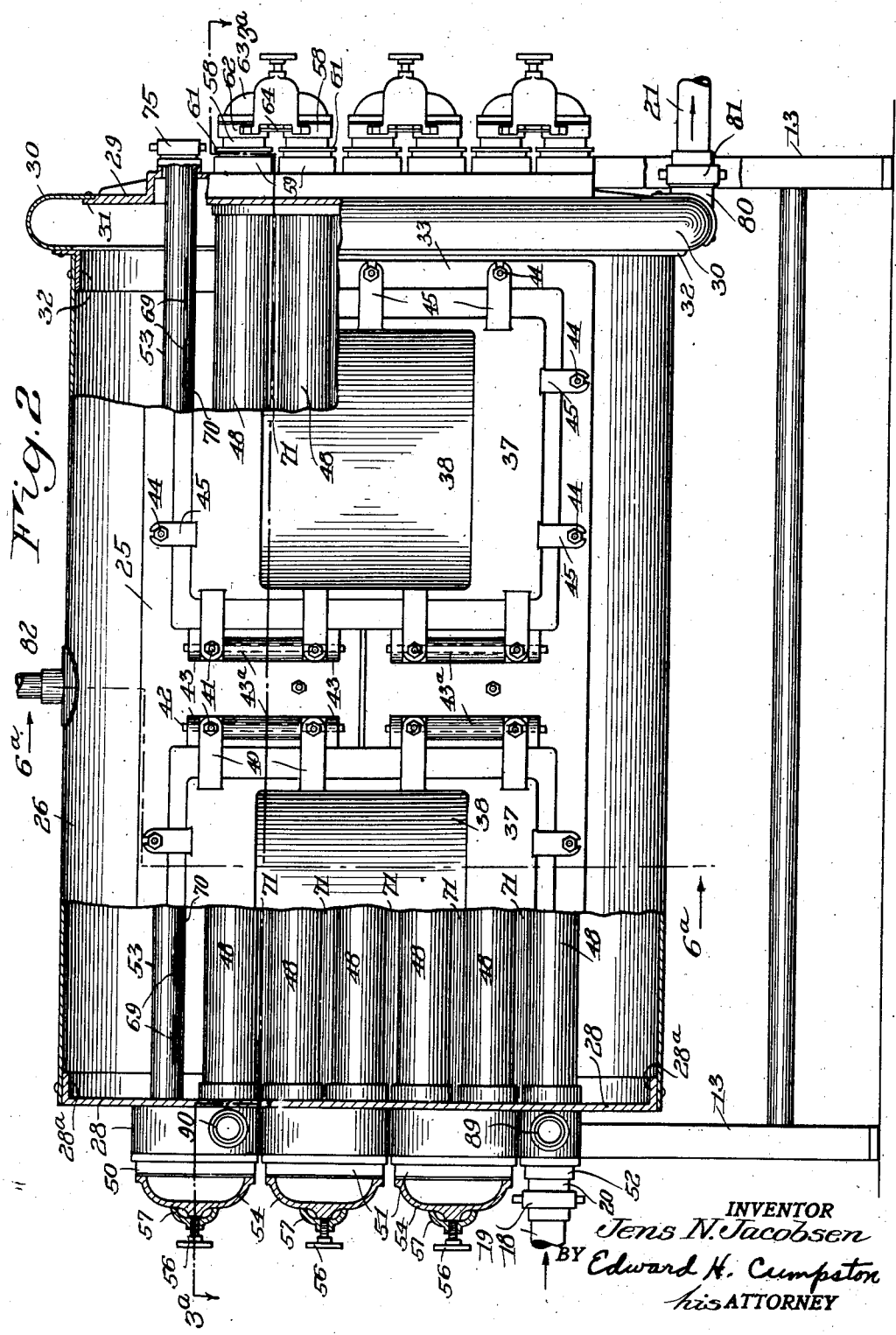

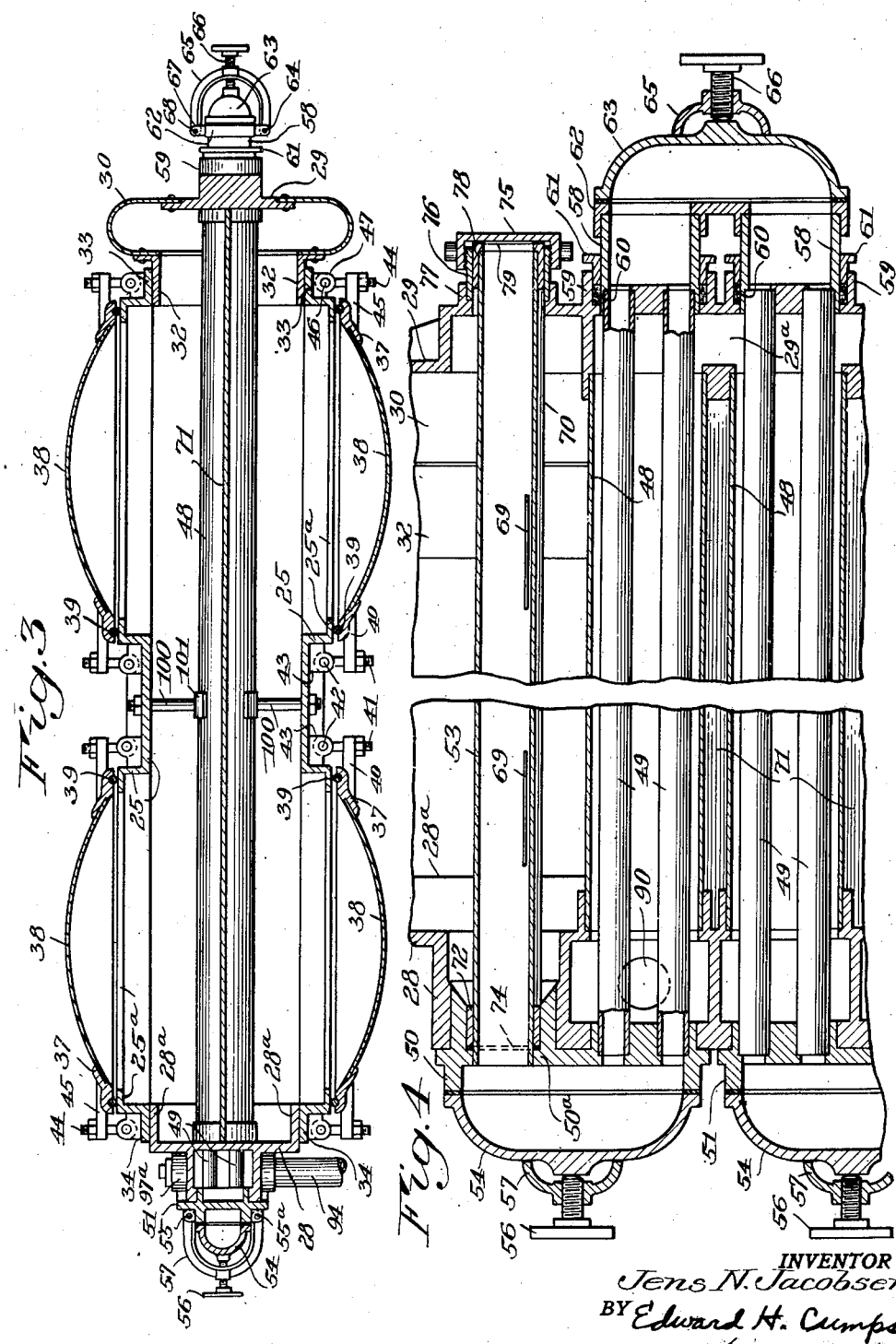

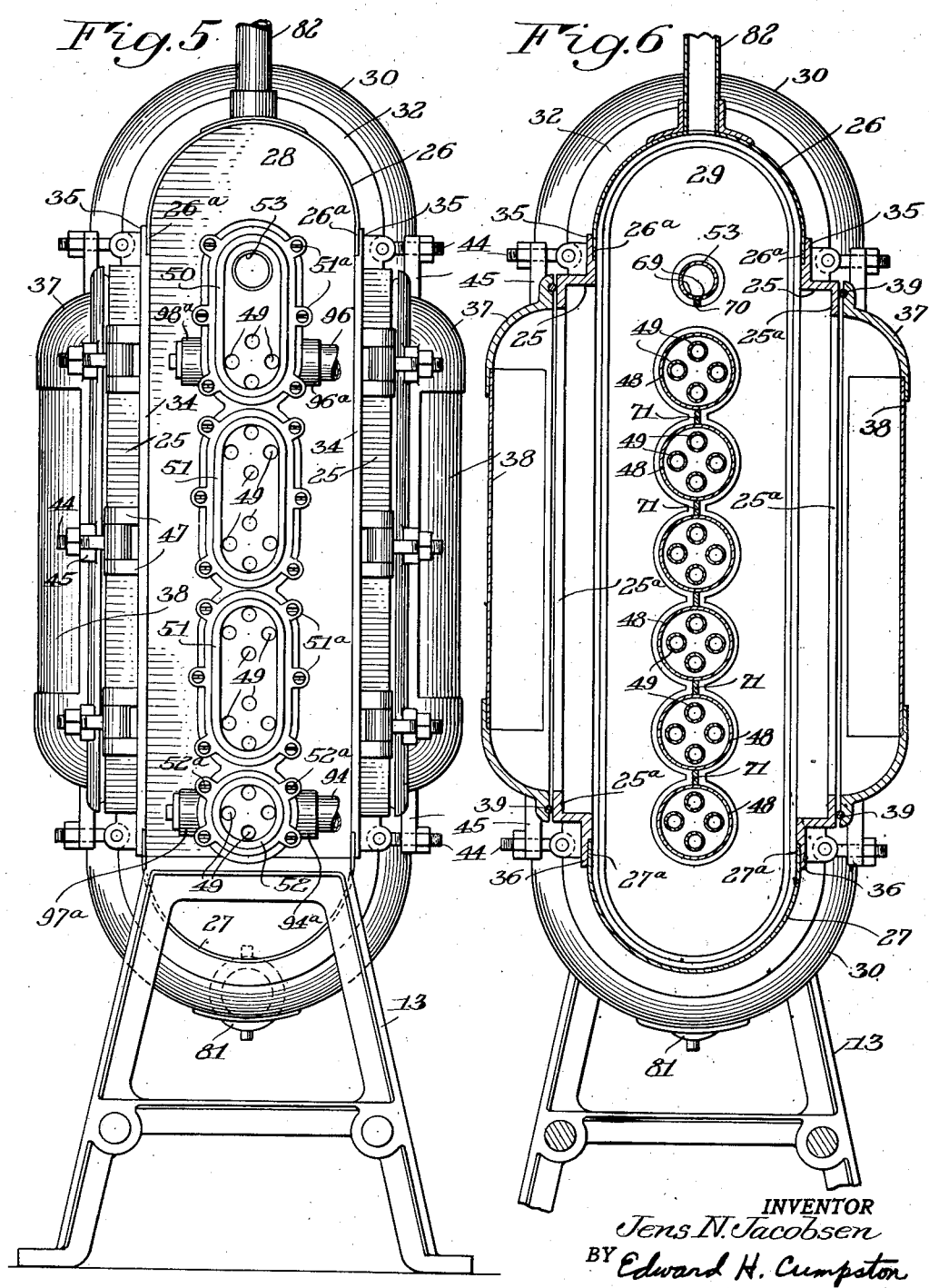

1,908,152

UNITED STATES PATENT OFFICE

JENS N. JACOBSEN, OF ALAMEDA, CALIFORNIA, ASSIGNOR TO THE PFAUDLER CO., OF ROCHESTER, NEW YORK, A CORPORATION OF NEW YORK

APPARATUS FOR TREATING LIQUIDS

Original application filed March 10, 1932, Serial No. 597,995. Divided and this application filed August 19, 1932. Serial No. 629,528.

The present invention relates to apparatus for treating different liquids and liquid food products and has for its object to provide improved means by which to treat the liquid in a rapid, efficient, and economical manner whereby to prepare or condition it for the market.

A further object of the invention is to provide improved means for treating and removing from milk, cream, and the like the various objectionable flavors and odors present therein, such, for example, as occur in milk as a result of the different kinds of foods on which the cows feed from time to time.

A further object of the invention is to provide improved means for treating liquids designed to circulate the liquid in contact with heat exchange means and to flow it in a thin film over a heating or cooling surface while at the same time subjecting the liquid to subnormal pressure to remove the gases and volatile constituents therefrom.

A further object of the invention is to provide improved apparatus for treating liquids, including a closed receptacle having heat exchange means therein connected with means for circulating the liquid through the heat exchange means and for discharging it within the receptacle, together with means for producing a partial vacuum within the receptacle to effect removal of the gases from the liquid.

A further object of the invention is to provide improved means for heating or cooling various liquids in the absence of oxygen in order to avoid any oxidation which might result from exposure of the liquid to the atmosphere.

A further object of the invention is to provide improved apparatus for rapidly de-aerating and deodorizing different liquids such, for example, as milk, cream, and the like, including means for treating the liquids to destroy certain objectionable bacteria or other organisms therein.

A further object of the invention is to provide improved apparatus designed for treating liquids affording a closed system including a supply source connected with a receptacle, the latter having therein heat transfer means for treating the liquid, means being connected with the receptacle for producing a partial vacuum therein to effect removal of the gases from the liquid, the vacuum producing means being also connected with the supply source to facilitate the flow therein of the liquid returning thereto from the receptacle.

A further object of the invention is to provide an improved heat exchange or transfer unit in which the liquid is caused to flow in one or more thin films or streams while under subnormal pressure in order to more efficiently and rapidly de-aerate and deodorize the liquids to be treated while subjecting the same either to the action of a heating or cooling medium within the unit.

To these and other ends the invention resides in certain improvements and combinations of parts, all as will be hereinafter more fully described, the novel features being pointed out in the claims at the end of the specification.

In the drawings:

Fig. 1 is a view in elevation of apparatus embodying the invention;

Fig. 2 is a part sectional elevation of the heat transfer unit drawn to an enlarged scale;

Fig. 3 is a sectional plan taken on line 3a—3a of Fig. 2;

Fig. 4 is a fragmentary sectional elevation taken longitudinally through the uppermost liquid circulating tubes of the heat transfer unit;

Fig. 5 is an end elevation of the heat transfer unit shown in Fig. 2 and viewed from the left thereof, the covers for the liquid circulating tubes being omitted to better show the arrangement of the latter;

Fig. 6 is a transverse sectional elevation taken substantially on line 6a—6a of Fig. 2, and Fig. 7 is an end elevation showing more or less diagrammatically the heat transfer unit and the means for circulating the heating or cooling medium therethrough.

The same reference numerals throughout the several views indicate the same parts.

The present application constitutes a division of my co-pending application for method and apparatus for treating liquids, Serial No. 597,995, filed March 10, 1932.

The invention relates to improved means for treating liquids and liquid food products such for example as milk, cream and the like and is designed for the heating or cooling of the liquid and for flowing the same in a state of sub-division, or in one or more thin films or streams, in a closed receptacle in which a partial vacuum is maintained to facilitate removal of the gases and volatile constituents from the liquid. The heating or cooling of the the liquid preferably takes place in a heat exchange unit associated with or disposed within the receptacle and the liquid on discharging from the unit in a state of sub-division is caused to flow by gravity upon the heated or cooled surfaces of the unit to better liberate the gases from the liquid. The liquid is pumped or otherwise caused to flow from a suitable source such, for example, as a supply or holding tank to and through the heat exchange means within the receptacle, which has a return pipe leading to the supply tank through which the liquid discharges, preferably by the action of gravity, the flow being facilitated by producing a partial vacuum in the supply tank during treatment of the liquid or during pasteurization of the milk or other liquid food products.

The bringing of the liquid to the desired temperature is effected by the circulation of a heating or cooling medium through the heat exchange means, the inner walls of which serve to heat or cool the liquid and the outer or exposed walls receiving the liquid in a sub-divided state as described hereinafter.

One advantage afforded by the present arrangement is that the heating or cooling area in contact with which the liquid is circulated is greatly increased without increasing the dimensions of the heat transfer unit, this being true by reason of the fact that in addition to circulating the liquid through the pipes lying within the outer tubular sections the entire outer surface of the latter may be employed as a heating or cooling area for the liquid and this while subjecting the liquid to subnormal pressure.

The present apparatus is well adapted for example for the pasteurizing of milk, cream, and the like, and affords a rapid, efficient, and economical arrangement for treating and preparing the same for the market without injury to the physical properties of the milk. When the pasteurizing operations have been completed a cooling medium may be circulated through the heat transfer unit and at the same time the pasteurized milk is recirculated therethrough and cooled to the desired temperature after which it is ready for bottling.

It will be understood that the vacuum chamber in the receptacle has sufficient height to permit of separation of the gases from the milk without causing the milk or other liquid to be withdrawn from the receptacle by the vacuum producing means. On the other hand, the temperature to which the liquid is subjected will be so regulated as not to result in the overheating or boiling of the liquid while circulating it through the heating unit under subnormal pressure or partial vacuum.

Referring to the drawings, 10 and 11 represent liquid holding tanks, and 12 a heat exchange or transfer unit connected therewith and supported by suitable standards 13. The tanks 10 and 11 are provided with outlet pipes 14 and 15 respectively, having connected therewith a two-way valve 16 from which extends a short pipe, not shown, which is connected with a pump 17. Leading from the pump is a pipe 18 connected by a coupling 19 with a short pipe 20 through which the liquid is discharged to the lowermost section of the heat transfer unit. The liquid after circulating through the unit, as described hereinafter, is discharged therefrom through a pipe 21 having a two-way valve 22 from which extends a pair of branch pipes 23 and 24, the former discharging into the liquid holding tank 10 and the latter discharging into the liquid holding tank 11. By properly adjusting the valve 22 the liquid passing through the heat exchange unit may be delivered first to one of the liquid holding tanks and then to another. In other words after the liquid in one tank has been properly treated by circulating it through the heat transfer unit, the pipes leading to and from said tank are closed by means of the valves 16 and 22, the valves at this time operating to open the pipes leading to and from the other tank to connect it with the heat transfer unit. It will be understood that the heat transfer unit may be connected with any desired number of liquid holding tanks such, for example, as milk pasteurizer-holder tanks for heating the milk to holding temperature, the milk being subsequently cooled for bottling by running it through the heat transfer unit while circulating a cooling medium therethrough.

The heat transfer unit 12 in which the circulating liquid is subjected to subnormal pressure is designed to afford a maximum degree of efficiency which is effected in part by circulating the liquid while under subnormal pressure in contact with the outer surfaces of the tubular sections through which the heating or cooling medium is continuously circulated, the sections being disposed in a closed receptacle in which a partial vacuum is produced to facilitate removal of the gases and volatile constituents from the liquid after having circulated it through the tubes surrounded by the heating or cooling medium.

The receptacle or outer casing of the heat transfer unit comprises a pair of side walls 25 which are preferably in the form of castings, the upper and lower edges of which are connected respectively with suitable top and bottom walls 26 and 27, each being preferably constructed of sheet metal and substantially semi-circular in shape as shown in Figs. 5 and 6. The fixed end wall or header 28 at the left of Fig. 2 is also preferably in the form of a casting and has inwardly extending side flanges 28a with which the side walls 25 are suitably connected. The opposite end wall or header 29 is also preferably in the form of a casting and is connected with a flexible sheet 30 of copper or other suitable material which constitutes in effect a diaphragm interposed between the wall of the header 29 and the side walls 25 as well as the top and bottom walls 26 and 27 to take care of the expansion and contraction of the tubular sections through which the heating or cooling medium and the liquid to be treated is circulated. The header 29 has secured upon its edges the outer wall of the diaphragm as indicated at 31 in Fig. 2, the overlapping portions of said walls and edges being connected preferably by riveting and the joints being sealed by soldering whereby to prevent leakage of the liquid. The rear wall of the diaphragm is preferably connected with the vertical flange of an end frame 32 which is in the form of a casting and which extends continuously around the sections of the heating unit in spaced relation thereto as best shown in Fig. 6. The side walls 25 have their extremities 33, at the diaphragm end of the unit, seated upon the outer face of the frame 32, as shown in Fig. 3 and are secured thereon by riveting or otherwise as desired, the joints between said parts being sealed by soldering or in any other preferred manner. Likewise the extremities 34 of the side walls are secured upon the flanged portions 28a of the header or end wall 28 of the heat exchange unit and the joints between these parts are sealed as by soldering or otherwise. The upper edges 35 of the side walls 25 are recessed to receive the bottom edges 26a of the sheet metal cover 26 as shown in Figs. 5 and 6, said parts being secured preferably by riveting them together and the joints between the same being sealed preferably by soldering or in any other preferred manner. The lower edges 36 of the side walls 25 are also recessed to receive the edges 27a of the bottom cover plate 27 as shown in Figs. 5 and 6, said parts being connected preferably by riveting and the joints between the same being sealed by soldering or in any desired manner. The ends of the top and bottom walls 26 and 27 at the left of Fig. 2 are secured upon the flanges 28a of the header 28, preferably by riveting and the opposite ends of said walls are likewise secured upon the frame 32.

The side walls 25 are offset outwardly and provided with openings having surrounding flange-like portions 25a, the openings being closed by suitable doors comprising the frame portions 37 and the relatively thin sheet metal plates 38 thereon shown in Fig. 6. However, if preferred the plates may be formed of glass or other suitable material. A liquid tight joint is afforded between each door and the corresponding flange 25a by a suitable gasket 39 constructed of rubber or any material suitable for the purpose. The doors are hinged at their inner edges to the walls 25 of the receptacle and for this purpose are provided with lugs 40 carrying pivot bolts 41, through the inner ends of which are extended pintles 42 rotatably supported by the spaced lugs 43 on said walls as best shown in Figs. 2 and 3. The pintles are extended through thimbles 43a interposed between the spaced lugs 43. The doors are clamped in closing position upon the gaskets 39 by means of a plurality of pivot bolts 44 extending through the slotted ends of the lugs 45 on the door and having disposed in their inner ends pintles 46 carried by the different sets of spaced lugs 47 on the side walls 25 of the casing. By tightening the nuts on the pivot bolts 44 along the edges of the doors, the latter may be urged into engagement with the gaskets 39 under considerable pressure, thus more effectively sealing the joints between the doors and the flanged portions 25a of the side walls 25 of the receptacle surrounding the heat transfer unit. By loosening the nuts on the bolts 44, the latter may be swung outwardly to disengage the lugs 45 on the doors thus releasing the latter for a swinging movement upon their hinges to render the interior portions of the casing accessible for cleaning from time to time.

The headers 28 and 29 form supporting means for the different tubular sections of the heat exchange unit disposed within the receptacle described above, the header 28 being fixed and the opposite header 29 free to move by reason of its being connected with the expansible section 30 of the unit, which in effect constitutes a yieldable diaphragm serving to take care of the expansion and contraction of the outer and inner tubular sections 48 and 49.

The headers 28 and 29 are adapted to receive the opposite ends of the larger tubes 48 in the usual manner as shown in Fig. 4. The fixed header 38 is designed to receive a plurality of manifolds for the reception of the smaller tubes 49, a number of which are grouped within each of the larger tubes as shown in Figs. 4 and 6. The manifolds are indicated at 50, 51, and 52. The upper manifold 50 is slightly different from the manifolds 51 since it is designed to receive in addition to a certain number of the smaller tubes 49, the outlet pipe 53 for discharging the liquid to be treated within the vacuum chamber in a state of relatively fine subdivision as subsequently described. The manifolds 50 and 51 are provided with covers 54 hinged thereon to swing about the axes of the pivot members 55, Figs. 1 and 3, and are clamped in closing position by screws 56 threaded through yokes 57 which are also hingedly connected with the pivot members 55 and which are secured upon the manifolds by pins 55a, Fig. 3. The manifold 52 receives the front ends of the smaller tubes 49 within the lowermost tubular section 48 and also receives the short connection 20 communicating with the tubes and held in position by means of screws 52a threaded into the wall of the header 28, Fig. 5.

The header 29 is provided with short tubular sections 58 arranged to receive the rear ends of the smaller tubes 49 as shown in Fig. 4, said sections being surrounded by spaced wall portions 59 on the header within which suitable packing 60 is compressed by the bushings 61 to afford liquid tight joints around the sections 58 in order to prevent leakage of the heating or cooling liquid circulating in the larger tubes 48. The sections 58 are arranged in pairs and communicate one with another through the members 62 thereon, upon each of which is seated a cover 63 hinged thereto to swing about the axis of a pivot member 64 upon which is also hinged a yoke 65 through which is threaded a screw 66 for clamping the cover upon its seat. The yoke at the opposite side from the pivot 64 is detachably connected with lugs 67 on the member 62 by means of a bolt 68, Fig. 3. By releasing the covers 54 and 63 at the opposite ends of the tubes 49, the latter are rendered accessible for cleaning and may thus be readily kept in a sanitary condition by the use of any suitable cleaning means.

It will be seen that the milk or other liquid to be treated, which is delivered by the pump 17 through the pipes 18 will be discharged through the manifold 52 of the header 28 into the tubes 49 in the lowermost tubular section 48, and will then flow continuously back and forth through the overlying tubes 49 until it reaches the manifold 50 from which it will pass into the outlet pipe 53, from which it is discharged through the ports 69 thereof in a state of relatively fine sub-division. The milk or other liquid discharging from the ports 69 will flow by gravity in separate streams downwardly in contact with and upon opposite sides of the larger tubes 48 through which the heating or cooling medium is circulated. In discharging through the oppositely arranged ports 69 the opposite streams of liquid are kept separated by means of a fin-like member 70 suitably secured on the bottom of the pipe 53 and extending substantially the full length thereof. By this arrangement the separate streams of milk or other liquid discharging downwardly on the opposite sides of the tubes 48 are caused to flow over the surfaces of the tubes in relatively thin films for the purpose stated. The separate streams of liquid divided by the fin 70 are prevented from uniting when flowing downwardly on the tubes 48 by the placing therebetween of the strips 71, Fig. 6, which serve to close the openings between the tubes, the joints between the strips and the tubes being sealed by soldering or otherwise as preferred.

The receiving end of the outlet pipe 53 has a collar 72 fixed thereon which is sleeved within the manifold 50, the tube being extended forwardly beyond the collar to a point substantially flush with the front face of the portion 50a of the manifold 50. A gasket 74 surrounds the pipe between said wall and the collar and is compressed by the latter to afford a liquid tight joint between the parts. The collar is urged in engagement with the gasket by reason of the pressure exerted against the opposite end of the pipe, afforded by screwing up the cap 75 which is threaded upon a ring 76 suitably anchored within the annular portion 77 of the header 29, as shown in Fig. 4. The outlet pipe 53 has fixed thereon at its rear end a collar 78 which is sleeved within the ring 76, a liquid tight joint between the collar and the cap 75 being afforded by a gasket 79 interposed between said parts. The fin 70 fixed on the bottom of the pipe 53 is removable therewith through the ring 76, the inside diameter of which is made large enough to permit the pipe with the fin thereon to pass through the ring when inserting the pipe within or withdrawing it from the heat transfer unit. By displacing the cover 54 at the front end of the pipe and the cap 75 at the rear end thereof the outlet pipe will be rendered accessible for cleaning by swabbing or otherwise as desired.

The lower end of the diaphragm section 30 of the receptacle is provided with an outlet fixture 80 arranged at the lowest point of the receptacle whereby to insure complete drainage of the liquid therefrom. The fixture 80 is connected by a coupling 81 with the discharge pipe 21 for returning the liquid to the tanks 10 and 11.

The means for producing a partial vacuum within the receptacle to subject the liquid therein to subnormal pressure to facilitate the removal of the gases and volatile constituents from the liquid comprises a pipe 82 leading from the top of the receptacle and extending to any suitable vacuum producing means such as that indicated diagrammatically at 83.

It is also desirable to produce a certain degree of vacuum within the liquid holding tanks 10 and 11, since it has been found that this facilitates a more rapid flow of the liquid thereto when the liquid is discharging by gravity from the heat transfer unit, thus making it unnecessary to provide a suction pump for drawing off the liquid from the unit. For this reason, therefore, the suction producing means 83 is connected through pipe 82 with the tanks 10 and 11 by means of the pipes 84 and 85 which are connected with the branch pipes 86 and 87 leading, respectively, to the tanks 10 and 11. A two-way valve 88 is provided for closing either of the pipes 86 and 87, depending on which of the liquid holding tanks is to be connected with the heat transfer unit.

Any suitable means may be provided for circulating the heating or cooling medium through the heat transfer unit, such as that shown more or less diagrammatically in Fig. 7. It will be noted that the header 28 of the unit is provided at its lower end with an inlet opening 89 which leads directly to the lowermost tubular section 48 and it is also provided near its upper end with an outlet 90 for the passage of the heating or cooling medium discharging from the uppermost tubular section 48. It will be understood that the liquid entering the lower section 48 will circulate back and forth from one of the superimposed sections to another until it has completed its course through the unit, said sections communicating with one another by suitable passages in the opposite headers 28 and 29, one of which is indicated at 29a in Fig. 4. The fluid circulating means in the present embodiment of the invention comprises a supply pipe 91 connected with any suitable source of liquid such as water, and carries at its lower end an ejector 92 of any suitable or well known type. The ejector is connected with the inlet 89 of the header 28 by means of the short pipes 93 and 94 having interposed therein a two-way valve 95 for controlling the flow of the liquid. The outlet opening 90 of the header has connected therewith a discharge pipe 96 which returns the liquid to the supply pipe 91. A pipe 97 is also connected with the valve 95 and is extended above the heat transfer unit to maintain a head of water into which the steam condensate is passed when the ejector is operating with the valve 95 open thereto. A valve 98 is provided in the water supply pipe 91 for closing the latter after a predetermined supply of water has been allowed to enter the heating unit to be heated by the steam admitted under the control of the ejector. The ejector is operated in the usual manner by a supply of steam admitted through pipe 99 which is connected with any suitable steam supply source, not shown. The admission of the steam can be regulated by any suitable or well known means, not shown, for controlling automatically or otherwise, the pressure or temperature of the steam for regulating the temperature of the water or other heating medium circulating through the heat exchange unit.

When it is desired to circulate a cooling medium through the heat exchange unit to cool the liquid flowing through the tubes 49, the steam supply is cut off, at which time the valve 95 is closed to the ejector. The cold water or other suitable cooling liquid is then permitted to enter the unit through the pipe 96 and to continuously circulate therethrough as long as desired, it being understood that the cooling liquid during this period will be discharged through the overflow pipe 97 at which time the valve 95 will be in position to close the pipe 93 connected with the ejector.

It will be seen from Figs. 3 and 5 that the header 28 is so designed as to permit the supply and discharge pipes 94 and 96, for conveying the heating or cooling medium to and from the unit, to be connected with either side thereof. This is made possible by providing the pipe receiving portions 97a and 98a on the header at points opposite the corresponding portions 94a and 96a for receiving the pipes 94 and 96 respectively.

In producing a partial vacuum within the receptacle surrounding the heating or cooling sections of the unit it is possible that there may be a tendency for the side walls of the unit to be deflected inwardly by reason of the difference in pressure on the interior and exterior surfaces thereof. In order to prevent such deflection, bracing members have been provided between said walls and certain of the tubular sections 48, these members preferably comprising bolts 100 carrying saddles 101 at their inner ends seated on certain of the tubular sections 48 and having their outer ends shouldered and extended through the side walls 25 of the receptacle and provided with nuts engaging the outer faces of the side walls as shown in Fig. 3.

In the processing of the liquid supplied to either of the tanks 10 or 11, the valves 16, 22, and 88 are properly adjusted to connect one or the other of the tanks with the heat transfer unit. Circulation of the milk or other liquid to be treated is then effected by operation of the pump 17. The liquid will thus be drawn from the tank and circulated through the tubes 49 surrounded by the heating or cooling medium within the tubular sections 48, the heating or cooling medium being kept at the desired predetermined temperature during circulation of the same. In discharging from the uppermost tubes 49 the liquid will enter the manifold 50 and from there it will pass into the discharge pipe 53 from which it will flow through the relatively narrow and preferably elongated ports 69 located at opposite sides of the fin 70 on the bottom of the pipe. The fin serves to prevent the streams of liquid discharging through the ports from uniting before being deflected downwardly in separate sheets or films. The downwardly flowing streams will discharge upon and at opposite sides of the uppermost tubular section 48 and will then flow downwardly in thin films over the surfaces of the sections, passing from one to another and discharging from the lowermost section into the bottom of the receptacle, it being understood that the streams of liquid flowing upon the opposite sides of the sections are prevented from uniting by the partitions 71 extending between the sections. The liquid discharging to the bottom of the receptacle is free to flow therefrom through the pipes 21 and 23 or 21 and 24 as the case may be, and is thus returned to the tank, the circulation being continued through the closed system as long as desired and the air at all times being excluded from the circulating liquid in order to prevent oxidation, which would occur if the liquid were exposed to the atmosphere.

During the period of treatment the liquid flows in thin films on the opposite surfaces of the tubular sections 48 of the unit and during this time it is subjected to subnormal pressure within the receptacle so that the liberated gases and volatile constituents are rapidly carried off by the vacuum producing means. By reason of the flowing of the liquid in relatively thin films over the heated or cooled surfaces of the tubular sections the gases are readily and quickly liberated to a greater degree than has been possible with the methods heretofore employed in the processing or liquids. The relatively large openings between the side walls of the receptacle and the thin films of liquid flowing downwardly on the tubular sections permit the gases liberated by the liquid to freely rise or escape to the top of the receptacle from which they are readily withdrawn under the action of the means employed for producing a partial vacuum within the receptacle. After completion of the processing operations described, the milk or other liquid is ready for bottling and can be drawn off from the tanks for this purpose.

The present arrangement is designed not only for the heating the liquid while continuously circulating it in a closed system under subnormal pressure for the purpose of liberating and removing the objectionable gases or volatile constituents from the liquid, but also for the subjection of the preheated liquid to subnormal pressure while being cooled by continuous circulation in a closed system to further complete the removal of any remaining objectionable gaseous or volatile constituents, while at the same time preventing any absorption of or reaction of oxygen from the air upon the liquid as a whole, this being the case both in the heating and cooling operations.

The present method may also be employed in the neutralizing process for sour cream in which the neutralizers produce chemical action resulting in the formation of gases. The cream also contains undesirable odors and the gases and odors are more readily separated from as well as absorbed or taken up by the butter fat in the cream when it is heated. The butter fat oxidizes in contact with air and consequently it is important to apply vacuum or subject the cream to subnormal pressure when it is first heated, or during the neutralizing process, in order to then remove the oxygen and other gaseous and volatile constituents which cause objectionable flavors and odors, by liberating and carrying off the same.

I claim:

1. Liquid treating apparatus, comprising a closed receptacle, heat exchange means within the receptacle, means for circulating the liquid through the heat exchange means, means for discharging it into the receptacle, and means for producing a partial vacuum within the receptacle to effect removal of the gases liberated by the liquid discharging within the receptacle.

2. Liquid treating apparatus, comprising a closed receptacle, heat exchange means within the receptacle, means for circulating the liquid through the heat exchange means, and means for discharging the liquid circulating through the heat exchange means in a state of subdivision within the receptacle and upon the heat exchange means.

3. Liquid treating apparatus, comprising a closed receptacle, heat exchange means within the receptacle, means for circulating the liquid through the heat exchange means, means for discharging the liquid circulating through the heat exchange means upon the exposed surfaces thereof for flow by gravity upon said surfaces within the closed receptacle, and means for producing a partial vacuum within the receptacle.

4. In a liquid treating apparatus, a closed system comprising a liquid holding tank, a receptacle, heat exchange means within the receptacle connected with the tank, means for causing the liquid to flow from the tank through the heat exchange means and into the receptacle, means for producing a partial vacuum within the receptacle to remove the gases liberated by the liquid discharging therein, and means connecting the receptacle and the tank for the return of the liquid to the latter.

5. In liquid treating apparatus, a closed system comprising a liquid holding tank, a receptacle, heat exchange means within the receptacle connected with the tank, means for causing the liquid to flow from the tank through the heat exchange means, means for delivering the liquid discharging from the heat exchange means in a state of subdivision upon the exposed surface of said heat exchange means, means for producing a partial vacuum within the receptacle to remove the gases liberated by the liquid discharging therein, and means connecting the receptacle and the tank for the return of the liquid to the latter.

6. In milk treating apparatus, a closed system comprising a holding tank for the milk, a receptacle connected with said tank, heat exchange means within the receptacle, means for withdrawing the milk from the tank and circulating it through the heat exchange means, and means connected with the heat exchange means arranged to discharge the milk circulating therethrough in a state of subdivision and in contact with the exposed surfaces of the heat exchange means.

7. In milk treating apparatus, a closed system comprising a holding tank for the milk, a receptacle connected with said tank, heat exchange means within the receptacle, means for withdrawing the milk from the tank and circulating it through the heat exchange means, means connected with the heat exchange means arranged to discharge the milk circulating therethrough in a state of subdivision and in contact with the exposed surfaces of the heat exchange means, and means for producing a partial vacuum within the closed receptacle.

8. In milk treating apparatus, a closed system comprising a holding tank for the milk, a receptacle connected with said tank, heat exchange means within the receptacle, means for withdrawing the liquid from the tank and circulating it through the heat exchange means, means connected with the heat exchange means arranged to discharge the milk circulating therethrough in a state of subdivision within the receptacle, means for returning the liquid from the receptacle to the tank, and means for simultaneously producing a partial vacuum within said tank and receptacle.

9. Liquid treating apparatus, comprising a closed receptacle, heat exchange means within the receptacle, means for circulating the liquid through the heat exchange means, and means for discharging the liquid circulating through the heat exchange means in a state of subdivision upon the exposed surfaces of said heat exchange means for flow by gravity thereon within the closed receptacle.

10. Liquid treating apparatus, comprising a closed receptacle, heat exchange means within the receptacle for heating or cooling the liquid to a predetermined degree, means for discharging the liquid circulating through the heat exchange means in a state of subdivision within the receptacle, and means for subjecting the liquid discharging into the receptacle to subnormal pressure.

11. In milk treating apparatus, a closed receptacle, heat transfer means within the receptacle, means for circulating the milk within the receptacle for pasteurization by the heat transfer means, and means connected with the circulating means and operating to discharge the pasteurized milk in a state of subdivision within the closed receptacle.

12. In milk treating apparatus, a closed receptacle, pasteurizing means for the milk within the receptacle, means for circulating the milk therethrough, means for discharging the milk from the pasteurizing means in a state of subdivision in contact with the exposed surfaces of the pasteurizing means, and means for producing a partial vacuum within the receptacle during circulation of the milk through said pasteurizing means and while discharging within the receptacle.

13. In milk treating apparatus, a closed receptacle, heating means within the receptacle, milk circulating means within the receptacle associated with the heating means, the latter serving to pasteurize the milk flowing through the circulating means, means within the receptacle for delivering the milk discharging from the heating means in one or more thin streams upon the exposed surfaces of the heating means, and means for producing a partial vacuum within the receptacle while the milk is flowing in contact with the heating means.

14. In liquid treating apparatus, a closed receptacle having a flexible wall at one side thereof, a heat transfer unit within the receptacle connected with said flexible wall and with one of the opposing walls of the receptacle, said unit including a plurality of tubes for the circulation of the liquid to be treated and also including tubular sections for the circulation of a heating or cooling medium, and means for discharging the liquid circulating through the tubes in contact with the surfaces of said tubular sections.

15. In liquid treating apparatus, a closed receptacle having a flexible wall at one side thereof, a heat transfer unit within the receptacle connected with said flexible wall and with one of the opposing walls of the receptacle, said unit including a plurality of tubes for the circulation of the liquid to be treated and also including tubular sections for the circulation of a heating or cooling medium, and a tubular outlet connection overlying said sections and communicating with said tubes arranged to discharge the liquid circulating through the tubes downwardly in one or more streams upon said tubular sections.

16. In liquid treating apparatus, a closed receptacle having a flexible wall at one side thereof, a heat transfer unit within the receptacle connected with said flexible wall and with one of the opposing walls of the receptacle, said unit including a plurality of tubes for the circulation of the liquid to be treated and also including spaced tubular sections surrounding the tubes and arranged for the circulation of the heating or cooling medium in contact with the tubes, means for discharging the liquid circulating through the tubes in contact with the outer surfaces of said tubular sections, means for circulating the liquid to be treated through said tubes, means for circulating the heating or cooling medium through the tubular sections, and means for producing a partial vacuum in said sections.

17. Liquid treating apparatus, comprising a closed receptacle having spaced headers thereon, a flexible connection interposed between one of the headers and the walls of the receptacle, communicating tubular sections within the receptacle having their opposite ends supported by said headers and arranged for the circulation of a heating or cooling medium therethrough, communicating liquid circulating tubes associated with said sections arranged for subjection to the heating or cooling medium therein, said flexible connection yielding under the expansion and contraction of the tubes and sections, and a discharge connection communicating with said tubes and arranged to discharge the liquid circulating through the tubes in contact with said sections.

18. Liquid treating apparatus, comprising a closed receptacle having spaced headers thereon, a flexible connection interposed between one of the headers and the walls of the receptacle, communicating tubular sections within the receptacle having their opposite ends supported by said headers and arranged for the circulation of a heating or cooling medium therethrough, communicating liquid circulating tubes associated with said sections arranged for subjection to the heating or cooling medium therein, said flexible connection yielding under the expansion and contraction of the tubes and sections, a discharge connection communicating with said tubes and arranged to discharge the liquid circulating through the tubes in contact with said sections and means for producing a partial vacuum in said receptacle.

19. Liquid treating apparatus, comprising a closed receptacle having spaced headers thereon, a flexible connection interposed between one of the headers and the walls of the receptacle, communicating tubular sections within the receptacle having their opposite ends supported by said headers and arranged for the circulation of a heating or cooling medium therethrough, communicating liquid circulating tubes associated with said sections arranged for subjection to the heating or cooling medium therein, said flexible connection yielding under the expansion and contraction of the tubes and sections, and a discharge connection supported by said headers and communicating with said tubes arranged to discharge the liquid circulating through the tubes in contact with said sections said discharge connection and one of the headers being free to move one upon another under expansion and contraction of said tubes and sections.

20. Liquid treating apparatus, comprising a closed receptacle having spaced headers thereon, a flexible connection interposed between one of the headers and the walls of the receptacle, communicating tubular sections within the receptacle having their opposite ends supported by said headers, means for circulating a heating or cooling medium through the sections, communicating liquid circulating tubes associated with said sections arranged for subjection to the heating or cooling medium therein, said flexible connection yielding under the expansion and contraction of the tubes and sections, a discharge connection supported by said header and communicating with said tubes arranged to discharge the liquid circulating through the tubes in contact with said sections, said discharge connection being fixed at one end to one of the headers and having its opposite ends sleeved within the opposite headers whereby to compensate for movement of the headers by expansion and contraction of the tubes and sections.

21. Liquid treating apparatus, comprising a closed receptacle having spaced headers thereon, a flexible connection interposed between one of the headers and the walls of the receptacle, communicating tubular sections within the receptacle having their opposite ends supported by said headers and arranged for the circulation of a heating or cooling medium therethrough, communicating liquid circulating tubes associated with said sections arranged for subjection to the heating or cooling medium therein, said flexible connection yielding under the expansion and contraction of the tubes and sections, a discharge connection supported by said headers and communicating with said tubes arranged to discharge the liquid circulating through the tubes in contact with said sections, said discharge connection being fixed at one end to one of the headers, the other end of the discharge connection extending through and having a slip joint connection with the opposite header, and a closure for the last mentioned end of the discharge connection removably secured thereto.

22. In liquid treating apparatus, a closed receptacle, a plurality of communicating sections within the receptacle arranged for the circulation of a heating or cooling medium therethrough, liquid circulating tubes within the sections for the passage of the liquid to be treated, means connected with the tubes arranged to discharge the circulating liquid in a state of relatively fine subdivision upon the exterior surface of one or more of said sections within the receptacle, and means for producing a partial vacuum within the receptacle.

23. In liquid treating apparatus, a closed receptacle, a plurality of communicating sections superimposed one upon another within the receptacle arranged for the circulation of a heating or cooling medium therethrough, communicating liquid circulating tubes within said sections arranged for the circulation therethrough of the liquid to be treated, means for circulating the liquid through said tubes, a liquid outlet tube overlying the sections and communicating with the liquid circulating tubes arranged to deliver the liquid discharging therefrom upon the uppermost of said sections in a state of subdivision for downward flow upon the sections, and means for producing a partial vacuum within the receptacle.

24. In liquid treating apparatus, a closed receptacle, a plurality of spaced communicating sections superimposed one upon another within the receptacle arranged for the circulation of a heating or cooling medium therethrough, communicating liquid circulating tubes within the sections arranged for the circulation therethrough of the liquid to be treated, a liquid outlet tube overlying the sections and communicating with the liquid circulating tubes, said outlet tube having oppositely arranged discharge ports for discharging the liquid upon opposite sides of the uppermost section, and partitions interposed between the spaced sections for closing the openings therebetween whereby to avoid the passing of the downwardly flowing liquid between the sections from one side thereof to another.

25. In liquid treating apparatus, a closed receptacle, a plurality of spaced communicating sections superimposed one upon another within the receptacle arranged for the circulation of a heating or cooling medium therethrough, communicating liquid circulating tubes within the sections arranged for the circulation therethrough of the liquid to be treated, a liquid outlet tube overlying the sections and communicating with the liquid circulating tubes, said outlet tube having oppositely arranged discharge ports for discharging the liquid in separate streams upon opposite sides of the center of the uppermost section, a fin on the bottom of the outlet tube for separating said streams, partitions interposed between the spaced secions for closing the openings therebetween whereby to avoid the passing of the downwardly flowing liquid through the sections from one side thereof to another, and means for producing a partial vacuum within the receptacle.

26. In liquid treating apparatus, heat exchange means comprising tubular sections for the circulation of the liquid to be treated having a discharge pipe connected therewith and additional sections for the circulation of a heating or cooling medium through which a plurality of the first mentioned sections are extended, a closed receptacle surrounding the heat exchange means arranged to receive the liquid discharging from said pipe, a liquid supply tank connected with the first mentioned tubular sections, means for pumping the liquid from the tank through said first mentioned tubular sections, a return connection leading from said closed receptacle to said tank, and means for simultaneously producing a partial vacuum in said tank and receptacle.

27. In liquid treating apparatus, a closed system comprising a tank, a receptacle having a gravity feed connection leading to the tank, a heat exchange device within the receptacle, means for circulating the liquid from the tank through the heat exchange device, a pipe communicating with the heat exchange device and having ports through which the liquid discharges downwardly over the exterior surfaces of said heat exchange device for return through said connection to the tank, and means for producing a partial vacuum within the tank and the receptacle.

28. In liquid treating apparatus, a heat transfer unit comprising a closed receptacle having spaced headers forming the end walls of the receptacle and having side walls connected with one of said headers and extending in the direction of the opposite header, a flexible connection interposed between the side walls and the last mentioned header, communicating tubular sections within the receptacle having their opposite ends supported by said headers, means for circulating a heating or cooling medium through said section, communicating liquid circulating tubes extending through the tubular sections and supported at their opposite ends by the headers, said flexible connection yielding under the expansion and contraction of the tubes, and a tubular outlet connection communicating with said tubes and arranged to discharge the liquid circulating therethrough downwardly within the receptacle in one or more thin films upon the exterior surfaces of the sections.

29. In liquid treating apparatus, a closed receptacle including side and end walls, superimposed communicating tubular sections within the receptacle arranged for the circulation of a heating or cooling medium therethrough, liquid circulating tubes extending through the tubular sections, manifolds connecting said tubes at the opposite ends thereof, a discharge pipe for the liquid circulating through the tubes, said pipe overlying the sections and arranged to discharge the liquid downwardly upon the exterior surfaces of the sections, one extremity of said pipe being received within one of the manifolds connecting the tubular sections at one end of the receptacle adjacent the top thereof and the other extremity of the pipe being sleeved within the opposite end wall of the receptacle, said pipe being detachable through the last mentioned end wall, and releasable means on said last mentioned end wall for holding the pipe in normal service position.

30. In liquid treating apparatus, a closed receptacle including side and end walls, superimposed communicating tubular sections within the receptacle arranged for the circulation of a heating or cooling medium therethrough, communicating liquid circulating tubes extending through said sections, means for circulating the liquid to be treated through said tubes, a discharge pipe for the circulating liquid extending above the sections and communicating at its front end with one or more of the tubes, said pipe having ports therein through which the liquid is discharged downwardly within the receptacle upon the sections, doors on one or more of the side walls of the receptacle serving to close the openings in said walls through which the parts within the receptacle are rendered accessible, and bracing means for the side walls extending therebetween.

JENS N. JACOBSEN.